July 21, 1925.
A. W. DUNN
WHEEL
Filed July 26, 1924
1,546,635
2 Sheets-Sheet 1
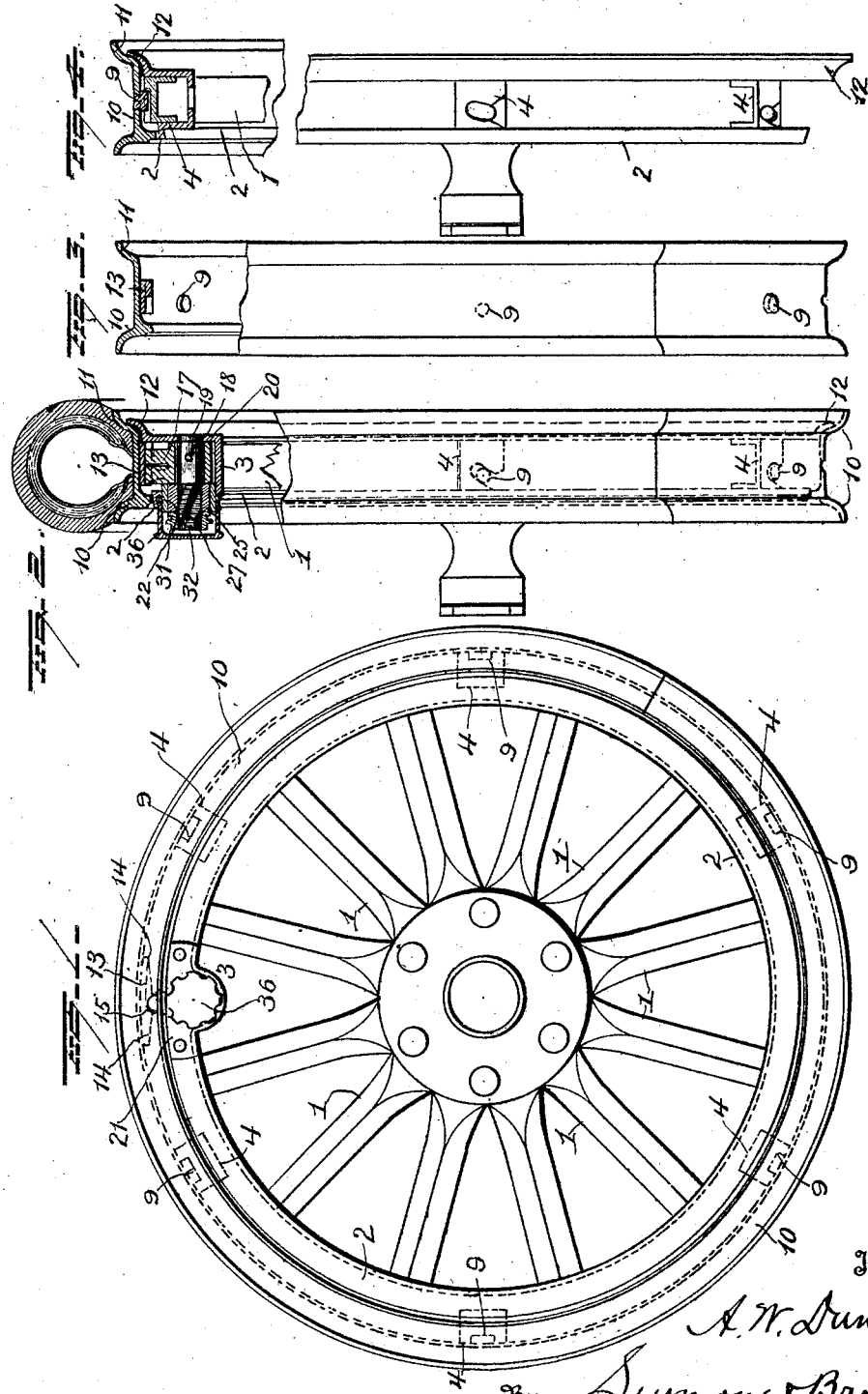

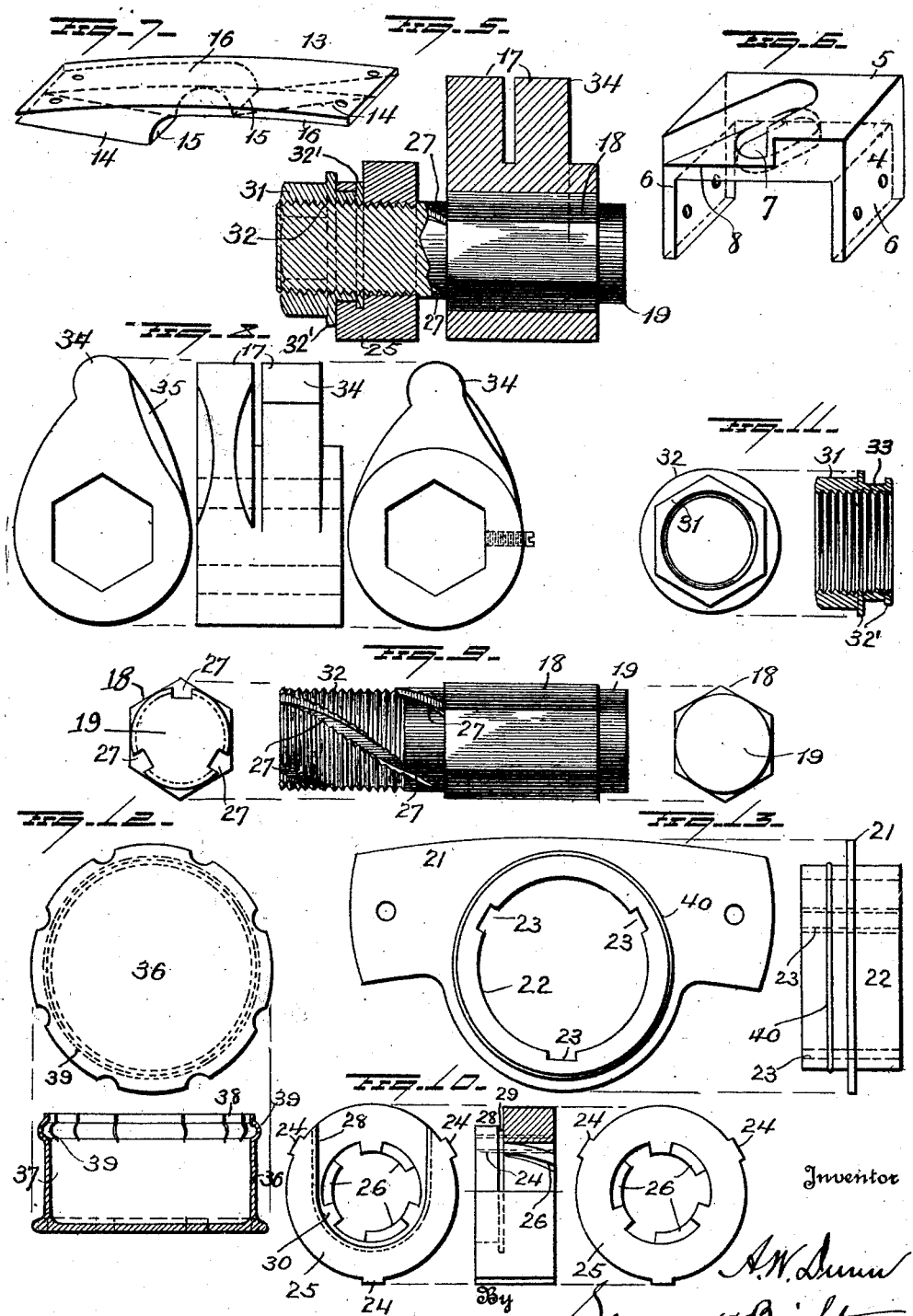

Patented July 21, 1925.

1,546,635

UNITED STATES PATENT OFFICE.

ALFRED W. DUNN, OF HONOMU, TERRITORY OF HAWAII.

WHEEL.

Application filed July 26, 1924. Serial No. 728,456.

*To all whom it may concern:*

Be it known that I, ALFRED W. DUNN, a citizen of the United States, and resident of Honomu, in the Territory of Hawaii, have invented certain new and useful Improvements in Wheels; and I do hereby declare the following to be a full, clear, and exact description of the invention, such as will enable others skilled in the art to which it appertains to make and use the same.

This invention relates to that type of wheels used generally on motor vehicles and including a demountable or removable tire-carrying rim which may be quickly removed when repairs to the tire are necessary. The invention relates more particularly to the means for securing the rim upon the wheel and seeks to provide a construction which is simple but strong and efficient and by which the rim will be held securely in place and prevented from accidentally working loose but may be quickly and easily removed or applied by an unskilled person. The invention is illustrated in the accompanying drawings and will be hereinafter fully described, the novel features being particularly pointed out in the appended claims.

In the drawings, Figure 1 is a side elevation of a portion of a wheel having my invention applied thereto;

Figure 2 is a transverse section with part in elevation;

Figure 3 is a detail transverse section of the rim;

Figure 4 is a detail transverse section of the rim and felly;

Figure 5 is an enlarged sectional elevation of the mechanism for locking and adjusting the rim;

Figure 6 is a detail perspective view of one of the keepers or brackets secured on the felly;

Figure 7 is a detail view of an abutment which is provided upon the rim;

Figure 8 is a view showing in detail the element which cooperates with said abutment;

Figure 9 is a detail view of the shaft which carries the element shown in Figure 8;

Figure 10 shows in detail a follower which is mounted upon the shaft to actuate the same;

Figure 11 shows the operating nut;

Figure 12 shows the hub cap;

Figure 13 shows details of the gear casing or housing.

The wheel comprises spokes 1 and felly 2 carried by the outer ends of the spokes, the felly being preferably of metal and of the channel formation shown in Figure 4. The circumferential continuity of the felly is interrupted at one point and an offset 3 formed thereat, which offset constitutes a part of the gear casing, and at intervals in the circumferential extent of the felly I secure therein the keeper brackets 4. As shown clearly in Figure 6, these brackets consist of a bridging web 5 and side flanges 6, the latter fitting snugly between and against the side flanges of the felly, as shown in Figure 4, and being welded or otherwise secured thereto. A diagonally extending slot 7 is formed in the bridging web 5 and the web is reduced in thickness at one corner, as at 8, the side walls of the slot being extended in flared relation across the reduced portion whereby a mouth or guideway leading into the slot is defined. Studs 9 are provided at intervals on the inner circumference of the rim, 10, and are properly spaced to engage in and cooperate with the keeper brackets. It will be readily seen that with the studs engaged in the slots circumferential movement imparted to the rim will cause simultaneous transverse movement, causing the flange 11 of the rim to bind against or withdraw from the flange 12 of the felly according to the direction of rotation. When the flanges are separated, continued transverse movement of the rim relative to the felly, will result in the removal or demounting of the rim.

Normally alined radially with the offset 3, a thrust block or abutment 13 is provided on the inner circumference of the rim and mechanism is mounted in the felly to act on the block for effecting the rotation or circumferential movement of the rim. The inner face of this thrust block is divided centrally into two longitudinally extending halves each having a portion 14 which is inclined relative to the outer surface of the block whereby a transverse shoulder 15 is formed, and a portion 16 which is parallel or concentric with the outer surface of the block, the corresponding portion being reversely arranged and the shoulders 15 being at opposite sides of the center of the plate transversely as well as longitudinally. Motion is imparted to the thrust block and through the same to the rim by cams or cranks 17 which are fitted to and secured upon the flat-sided portion 18 of a shaft 19 which has its inner end journaled in the inner wall 20 of the offset 3 and its outer end extending through a face plate 21, said face plate being secured to the felly and extending across the open outer side of the offset. The face plate is formed on and extends laterally from a housing 22 which fits in the open outer side of the offset 3 and has longitudinal straight grooves 23 in the wall of its bore to slidably receive mating ribs 24 upon the exterior of a follower sleeve 25, the sleeve being thereby prevented from rotating in the housing but permitted to move endwise therein. The follower sleeve encircles the outer end portion of the shaft 19 and is provided interiorly with spiral ribs 26 to fit in corresponding grooves 27 in the shaft so that when endwise movement is imparted to the follower the shaft will be caused to rotate. The outer end of the follower is cut away, as at 28, and a narrow groove 29 is formed in the wall of the U-shaped seat 30 thus produced. An operating nut 31 is fitted to the seat and has its bore properly threaded to engage the threads 32 on the shaft 19, it being noted that said threads and the spiral grooves 27 extend from the outer end of the shaft to or approximately to the cranks 17. The operating nut is provided at its inner end and near said end with circumferential ribs 32' and its external diameter is reduced, as at 33, between said ribs to rest upon the seat 30 with the inner rib 32 engaging the groove 29 in the follower sleeve 25. If the nut 31 be turned, its threaded engagement with the shaft 19 will cause it to ride along the shaft and impart endwise movement directly to the follower sleeve whereupon the ribs 26 acting on the grooves 27 will cause rotation of the shaft with resultant rocking of the cranks 17. It is to be noted that the cranks are formed with terminal heads 34 reversely arranged and adapted to act upon the respective shoulders 15 of the thrust block, and that the back 35 of each crank is properly shaped to pass under and bear against the surface 16 of the thrust block.

To exclude dust, I provide a cap 36 the circular rim 37 of which is split and resilient, as at 38, and internally grooved, as at 39, to fit over the end of the housing or barrel 22 and engage an annular bead 40 thereon.

From the foregoing description, taken in connection with the accompanying drawings, it will be seen that rotation of the operating nut effects rotation of the shaft which causes rocking of the cranks and resultant circumferential movement of the rim. The studs 9 upon the rim engaged in the slots 7 of the keeper brackets on the felly effect transverse movement of the rim so that it may be quickly demounted or locked in place according to the direction of movement of the operating nut. The structure is compact, strong, neat in appearance, and very efficient in operation. The cranks or locking cams are always in engagement with the thrust block when the rim is on the wheel and resists all tendency of the rim to work in or out of the keepers, relieving the keepers of all driving strains which are taken up by the cams or cranks. The differential movement of the operating nut and the shaft overcomes all tendency of the device to work loose, and it may be adjusted to any degree of tension, a turn of the operating nut compensating for wear which is prevalent in tire rims.

Having fully described my invention what I claim as new and desire to secure by Letters-Patent, is:—

1. The combination of a felly, a plurality of brackets carried by the felly and provided with slots disposed diagonally relative to the circumference of the felly, a rim mounted on the felly, a plurality of studs on the rim engaging in the slots in the brackets, and interengaging means on the rim and the felly for effecting circumferential movement of the rim.

2. The combination of a felly, a rim, a thrust block on the rim, a shaft mounted transversely on the felly, cranks on said shaft engaging the thrust block whereby to effect circumferential movement of the rim, and interengaging means on the rim and the felly whereby the rim will be moved transversely of the felly simultaneously with its circumferential movement.

3. The combination of a felly, a rim mounted thereon, a thrust block on the rim having reversely arranged shoulders and reduced portions, a shaft mounted on the felly, and reversely arranged cams on the shaft each cooperating with one of the shoulders and a reduced portion of the thrust plate to move the rims circumferentially and lock it in a set position.

4. The combination of a felly having an inwardly offset portion, a rim mounted on the felly, a shaft housed in the offset portion of the felly, means on the shaft to engage the rim and move it circumferentially, and means on the shaft and the offset portion of the felly to actuate the shaft and lock it in a set position.

5. The combination of a felly, a rim mounted thereon, a housing on the felly, a shaft mounted in the felly and extending into the housing, means on the shaft to engage the rim and move it circumferentially upon rotation of the shaft, a follower mounted in the housing for endwise movement and engaging the shaft to effect rotation thereon, and an operating nut rotatably mounted on the shaft and having swiveled engagement with the follower.

6. The combination of a felly, a rim mounted thereon, a housing mounted on the felly and having straight longitudinal grooves in its bore, a shaft mounted at one end in the felly and having its opposite end extending through the housing, the last-mentioned end of the shaft being threaded and provided with spiral grooves, means on the shaft to engage the rim, a follower sleeve fitted in the housing and about the shaft and with straight longitudinal external ribs engaging the longitudinal grooves in the housing and with internal spiral ribs engaging the spiral grooves in the shaft, the outer end of the sleeve having a U-shaped seat and a groove in the wall of said seat, and an operating nut threaded onto the shaft and fitted to said seat and having an external bead fitting in the groove in the seat.

In testimony whereof, I have signed this specification in the presence of two subscribing witnesses.

ALFRED W. DUNN.

Witnesses:
D. G. BUTCHART,
R. A. CLINDULING.